US009910525B2

(12) United States Patent
Ding et al.

(10) Patent No.: US 9,910,525 B2
(45) Date of Patent: Mar. 6, 2018

(54) TOUCH SCREEN AND DRIVING METHOD FOR THE SAME, DISPLAY APPARATUS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaoliang Ding, Beijing (CN); Xue Dong, Beijing (CN); Xiaochuan Chen, Beijing (CN); Haisheng Wang, Beijing (CN); Yingming Liu, Beijing (CN); Wei Liu, Beijing (CN); Pengpeng Wang, Beijing (CN); Tao Ren, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/501,695

(22) PCT Filed: Aug. 24, 2016

(86) PCT No.: PCT/CN2016/096500
§ 371 (c)(1),
(2) Date: Feb. 3, 2017

(87) PCT Pub. No.: WO2017/067318
PCT Pub. Date: Apr. 27, 2017

(65) Prior Publication Data
US 2017/0277321 A1    Sep. 28, 2017

(30) Foreign Application Priority Data

Oct. 22, 2015    (CN) .......................... 2015 1 0695184

(51) Int. Cl.
*G06F 3/041*    (2006.01)
*G06F 3/044*    (2006.01)
(Continued)

(52) U.S. Cl.
CPC ........ *G06F 3/0412* (2013.01); *G02F 1/13338* (2013.01); *G02F 1/133514* (2013.01);
(Continued)

(58) Field of Classification Search
CPC ....... G06F 3/044; G06F 3/0412; G06F 3/0414
(Continued)

(56) References Cited

U.S. PATENT DOCUMENTS

2013/0335367 A1* 12/2013 Kim .................... G09G 3/3696
   345/174
2015/0169121 A1*  6/2015 Yao ........................ G06F 3/044
   345/174

FOREIGN PATENT DOCUMENTS

CN    102945094 A    2/2013
CN    103207720 A    7/2013
(Continued)

OTHER PUBLICATIONS

International Search Report dated Nov. 30, 2016 corresponding to International application No. PCT/CN2016/096500.
(Continued)

*Primary Examiner* — Calvin C Ma
(74) *Attorney, Agent, or Firm* — Nath, Goldberg & Meyer; Joshua B. Goldberg; Annie J. Kock (57) ABSTRACT

A touch screen comprises a fixed electrode disposed on a side of an array substrate away from a color filter substrate, the array substrate comprises a base substrate, a plurality of sensing lines and a plurality of common electrodes arranged in a matrix, orthographic projections of the sensing lines and the fixed electrode on the base substrate overlap with
(Continued)

orthographic projections of the common electrodes on the base substrate, an extending direction of the sensing line is parallel to a column direction of arrangement of the common electrodes; a portion of the common electrodes function as first driving electrodes during a pressure sensing touch control, the sensing lines corresponding to the rest common electrodes function as sensing electrodes during the pressure sensing touch control; the fixed electrode assists the first driving electrodes and the sensing electrodes to detect a touch pressure during the pressure sensing touch control.

20 Claims, 3 Drawing Sheets (51) Int. Cl.
   *G02F 1/1333* (2006.01)
   *G02F 1/1335* (2006.01)
   *G02F 1/1343* (2006.01)
   *G02F 1/1362* (2006.01)
(52) U.S. Cl.
   CPC .. *G02F 1/134336* (2013.01); *G02F 1/136286* (2013.01); *G06F 3/044* (2013.01); *G06F 3/0416* (2013.01); *G02F 2001/13629* (2013.01); *G02F 2201/121* (2013.01); *G06F 2203/04105* (2013.01)

(58) Field of Classification Search
   USPC .................................................. 345/173–174
   See application file for complete search history.

(56)   References Cited

FOREIGN PATENT DOCUMENTS

| | | |
|---|---|---|
| CN | 104750339 A | 7/2015 |
| CN | 205038623 U | 2/2016 |
| EP | 2500804 A2 | 9/2012 |

OTHER PUBLICATIONS

Written Opinion of the International Searching Authority dated Nov. 30, 2016 corresponding to International application No. PCT/CN2016/096500.

* cited by examiner

TOUCH SCREEN AND DRIVING METHOD FOR THE SAME, DISPLAY APPARATUS

This is a National Phase Application filed under 35 U.S.C. 371 as a national stage of PCT/CN2016/096500, filed Aug. 24, 2016, an application claiming the benefit of Chinese Application No. 201510695184.2, filed Oct. 22, 2015, the content of each of which is hereby incorporated by reference in its entirety.

FIELD

The present invention relates to a field of display technology, and particularly, to a touch screen and a driving method for the same, and a display apparatus.

BACKGROUND

A pressure sensing technology is a technology capable of detecting an external force, and has been used in fields of industrial control, medical, etc. for a long time. Currently, many manufacturers are seeking for an appropriate solution to achieve a pressure sensing touch control in a display field (in particular, in a mobile phone or flat panel display field), because displays with a pressure sensing touch control function can make users get a better human-computer interaction experience.

However, the displays with the pressure sensing touch control function in the prior art mostly achieve the pressure sensing touch control function thereof by providing a pressure sensing touch control mechanism additionally in a backlight portion of the display (e.g., liquid crystal display) or a middle-frame portion of the display (e.g., mobile phone), and this design needs to modify a structure of the display itself, and when assembling the pressure sensing touch control mechanism in the display, since there is a large assembly tolerance, a pressure sensing accuracy of the pressure sensing touch control mechanism is limited significantly; and in addition, this design makes the display to achieve the pressure sensing touch control with a relatively high cost, which is harmful to rapidly and widely spread the pressure sensing touch control in the display field.

SUMMARY

In view of at least one of above problems existing in the prior art, the present invention provides a touch screen and a driving method for the same, and a display apparatus. The touch screen achieves a completely embedded pressure sensing touch control which reduces a manufacturing difficulty of a pressure sensing touch screen, improves a touch control accuracy of the pressure sensing touch screen, and reduces a cost of producing and assembling of the pressure sensing touch screen, and thus the pressure sensing touch screen can more rapidly and widely spread.

In an aspect, the present invention provides a touch screen comprising a liquid crystal cell formed by aligning and combining an array substrate with a color filter substrate and a fixed electrode disposed on a side of the array substrate away from the color filter substrate, wherein the array substrate comprises a base substrate, a plurality of sensing lines and a plurality of common electrodes arranged in a matrix, which are disposed on the base substrate, orthographic projections of the sensing lines and the fixed electrode on the base substrate overlap with orthographic projections of the common electrodes on the base substrate, an extending direction of the sensing line is parallel to a column direction of arrangement of the common electrodes; a portion of the common electrodes are configured to function as first driving electrodes during a pressure sensing touch control, the sensing lines corresponding to the rest common electrodes are configured to function as sensing electrodes during the pressure sensing touch control; the fixed electrode is configured to assist the first driving electrodes and the sensing electrodes to detect a touch pressure during the pressure sensing touch control.

Preferably, odd columns of the common electrodes are configured to function as the first driving electrodes during the pressure sensing touch control, and the sensing lines corresponding to even columns of the common electrodes are configured to function as the sensing electrodes during the pressure sensing touch control.

Alternatively, even columns of the common electrodes may be configured to function as the first driving electrodes during the pressure sensing touch control, and the sensing lines corresponding to odd columns of the common electrodes may be configured to function as the sensing electrodes during the pressure sensing touch control.

Preferably, the common electrodes are provided at a side of the sensing lines proximal to the color filter substrate, and an insulating layer is provided between the common electrodes and the sensing lines; and the array substrate further comprises a plurality of data lines, the sensing lines and the data lines are made of a same material and provided in a same layer, the sensing lines are parallel to the data lines.

Preferably, the sensing lines and the data lines are arranged side by side in a one-to-one correspondence mode.

Alternatively, the array substrate may further comprise a plurality of first data lines, the sensing lines, the data lines and the first data lines are made of a same material and provided in a same layer, and in an arrangement direction of the data lines, two data lines are provided in an interval between every two of the first data lines, the sensing lines and the first data lines are arranged side by side in a one-to-one correspondence mode.

Preferably, the color filter substrate comprises a black matrix, and an orthographic projection of the black matrix on the array substrate completely covers the sensing lines and the data lines.

Preferably, the touch screen further comprises a backlight source, the backlight source is provided at a side of the array substrate away from the color filter substrate, the fixed electrode is disposed at a side of the backlight source away from the array substrate, and the fixed electrode is grounded or connected to a fixed voltage.

Preferably, the first driving electrodes in a same row are connected to a same driving signal line; and the sensing lines functioning as the sensing electrodes and corresponding to each column of the common electrodes are connected together.

Alternatively, each of the first driving electrodes in a same row may be connected to one driving signal line; and the sensing lines functioning as the sensing electrodes and corresponding to each column of the common electrodes are connected together.

Preferably, the common electrodes are also configured to function as second driving electrodes during a self-capacitance sensing touch control, and each of the second driving electrodes is connected to one driving signal line.

The present invention also provides a display apparatus comprising the touch screen described above.

In another aspect, the present invention further provides a driving method for the touch screen described above, and the driving method comprises a display stage and a pressure sensing touch control stage, the display stage and the pressure sensing touch control stage are performed in a time division mode;

in the display stage, a common voltage signal is provided to the common electrodes;

in the pressure sensing touch control stage, a portion of the common electrodes function as the first driving electrodes and are provided with a pressure sensing touch control driving signal, the sensing lines corresponding to the rest common electrodes function as the sensing electrodes to sense a change of the pressure sensing touch control driving signal, the fixed electrode assists the first driving electrodes and the sensing electrodes to detect the touch pressure, meanwhile, a common voltage signal is provided to the common electrodes corresponding to the sensing electrodes.

Preferably, odd columns of the common electrodes function as the first driving electrodes during the pressure sensing touch control, and the sensing lines corresponding to even columns of the common electrodes function as the sensing electrodes during the pressure sensing touch control.

Alternatively, even columns of the common electrodes may function as the first driving electrodes during the pressure sensing touch control, and the sensing lines corresponding to odd columns of the common electrodes may function as the sensing electrodes during the pressure sensing touch control.

Preferably, in the pressure sensing touch control stage, the first driving electrodes are driven row by row.

Preferably, the pressure sensing touch control stage is inserted after displaying of any row of pixels in a frame of a picture and before displaying of the next row of pixels in the frame of the picture; or, the pressure sensing touch control stage is inserted after displaying of a frame of a picture and before displaying of the next frame of the picture.

Preferably, the driving method further comprises a self-capacitance sensing touch control stage, the display stage, the pressure sensing touch control stage and the self-capacitance sensing touch control stage are performed in a time-division mode; and in the self-capacitance sensing touch control stage, all of the common electrodes function as second driving electrodes and are provided with a self-capacitance sensing touch control driving signal.

Preferably, in the self-capacitance sensing touch control stage, the second driving electrodes are driven simultaneously.

Preferably, the self-capacitance sensing touch control stage is inserted after displaying of any row of pixels in a frame of a picture and before displaying of the next row of pixels in the frame of the picture; or, the self-capacitance sensing touch control stage is inserted after displaying of a frame of a picture and before displaying of the next frame of the picture.

The present invention can achieve at least one of following beneficial effects.

The touch screen of the present invention achieves a completely embedded pressure sensing touch control by using a portion of the common electrodes as the first driving electrodes during the pressure sensing touch control, using the sensing lines corresponding to the rest common electrodes arranged alternatively with the first driving electrodes as the sensing electrodes during the pressure sensing touch control, and using the middle-frame for supporting the touch screen as the fixed electrode to assist detecting of a touch pressure, which reduces a manufacturing difficulty of a pressure sensing touch screen, improves a touch control accuracy of the pressure sensing touch screen, and reduces a cost of producing and assembling of the pressure sensing touch screen, and thus the pressure sensing touch screen can be more rapidly and widely spread.

The display apparatus of the present invention also achieves a completely embedded pressure sensing touch control by using the touch screen of the present invention, and also reduces a cost of producing and assembling of the display apparatus.

DETAILED DESCRIPTION OF THE EMBODIMENTS

In order to make a person skilled in the art understand technical solutions of the present invention better, the touch screen and the driving method for the same, and the display apparatus of the present invention will be further described in detail below in conjunction with accompanying drawings and specific embodiments.

First Embodiment

Figure 1:
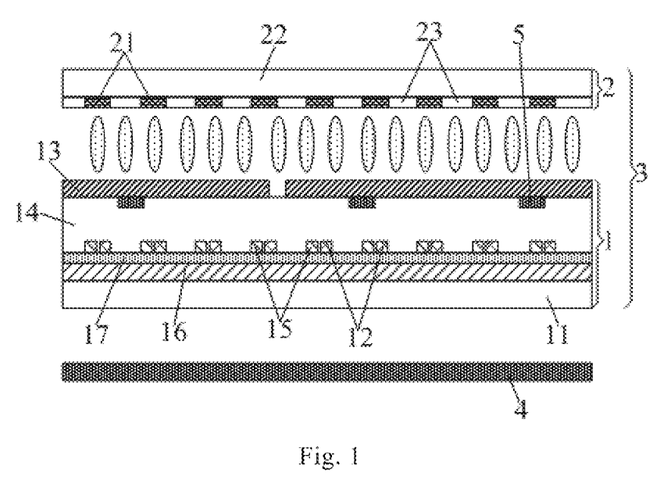
FIG. 1 is a structural cross-sectional view diagram of a touch screen in a first embodiment of the present invention.

The present embodiment provides a touch screen, and as shown in FIG. 1, the touch screen comprises a liquid crystal cell 3 formed by aligning and combining an array substrate 1 with a color filter substrate 2 and a fixed electrode 4 disposed on a side of the array substrate 1 away from the color filter substrate 2, wherein the array substrate 1 comprises a base substrate 11, a plurality of sensing lines 12 and a plurality of common electrodes 13 arranged in a matrix, which are disposed on the base substrate 11, orthographic projections of the sensing lines 12 and the fixed electrode 4 on the base substrate 11 overlap with orthographic projections of the common electrodes 13 on the base substrate 11, an extending direction of the sensing line 12 is parallel to a column direction of arrangement of the common electrodes 13; odd columns of the common electrodes 13 are configured to function as first driving electrodes during a pressure sensing touch control, the sensing lines 12 corresponding to even columns of the common electrodes 13 are configured to function as sensing electrodes during the pressure sensing touch control; the fixed electrode 4 is configured to assist the common electrodes 13 functioned as the first driving electrodes and the sensing lines 12 functioned as the sensing electrodes to detect a touch pressure when the pressure sensing touch control is performed.

When the touch screen is installed into a display apparatus (e.g., a mobile phone), a middle-frame is generally provided between the touch screen and the display apparatus, in an aspect, the middle-frame is used for supporting the touch screen, in another aspect, the middle-frame is used for shielding and isolating the touch screen from an inside of the display apparatus, and in the present embodiment, the fixed electrode 4 may be formed by the middle-frame. When a pressure sensing touch control is performed, a mutual capacitance is generated between the first driving electrode and the sensing electrode, the mutual capacitance changes with a change of a pressure applied on the touch screen during the pressure sensing touch control, that is, when the pressure sensing touch control is performed, the larger the pressure applied on the touch screen is, the larger a change of the mutual capacitance is, thus the touch screen achieves the pressure sensing touch control.

The touch screen achieves a completely embedded mutual-capacitance pressure sensing touch control by using a portion of the common electrodes 13 as the first driving electrodes during the pressure sensing touch control, using the sensing lines 12 corresponding to the rest common electrodes 13 arranged alternatively with the first driving electrodes as the sensing electrodes during the pressure sensing touch control, and using the middle-frame for supporting the touch screen as the fixed electrode 4 to assist detecting of a touch pressure, which reduces a manufacturing difficulty of a pressure sensing touch screen, improves a touch control accuracy of the pressure sensing touch screen, and reduces a cost of producing and assembling of the pressure sensing touch screen, and thus the pressure sensing touch screen can be more rapidly and widely spread.

It should be noted that, even columns of the common electrodes 13 may function as first driving electrodes during a pressure sensing touch control, the sensing lines 12 corresponding to odd columns of the common electrodes 13 may function as sensing electrodes during the pressure sensing touch control.

In the present embodiment, the common electrodes 13 are provided at a side of the sensing lines 12 proximal to the color filter substrate, and an insulating layer 14 is provided between the common electrodes 13 and the sensing lines 12; and the array substrate 1 further comprises a plurality of data lines 15, the sensing lines 12 and the data lines 15 are made of a same material and provided in a same layer, the sensing lines 12 are parallel to the data lines 15; the sensing lines 12 and the data lines 15 are arranged side by side in a one-to-one correspondence mode. In such a configuration, mutual capacitances are generated between the odd columns of the common electrodes 13 and the sensing lines 12 corresponding to the even columns of the common electrodes 13 (or between the even columns of the common electrodes 13 and the sensing lines 12 corresponding to the odd columns of the common electrodes 13), thus the touch screen achieves the pressure sensing touch control with an assistance of the fixed electrode 4, and since the sensing lines 12 and the data lines 15 are formed by a single patterning process, a manufacturing procedure of the touch screen is simplified, thus a cost for manufacturing the touch screen is reduced.

In addition, the sensing lines 12 and the data lines 15 are arranged side by side in a one-to-one correspondence mode, that is to say, each data line 15 is provided with a sensing line 12 by the side thereof, and in such a configuration, a display uniformity of the touch screen is improved while achieving the pressure sensing touch control of the touch screen.

In the present embodiment, the color filter substrate 2 comprises a black matrix 21, and the black matrix 21 completely covers the sensing lines 12 and the data lines 15, that is, an orthographic projection of the black matrix 21 on the array substrate 1 completely covers the sensing lines 12 and the data lines 15, in such a configuration, the sensing lines 12 will not affect a normal display of the touch screen.

Furthermore, in the present embodiment, a gate layer 16 is further provided on the base substrate 11 of the array substrate 1, the gate layer 16 comprises a gate and a gate line, and is provided at a side of the data lines 15 proximal to the base substrate 11, a gate insulating layer 17 is further provided between the gate layer 16 and the data lines 15. The color filter substrate 2 further comprises a base substrate 22 and a color filter layer 23, the color filter layer 23 comprises color filters with red, green, and blue colors respectively, both the color filter layer 23 and the black matrix 21 are provided on a side of the base substrate 22 facing to the array substrate 1, and the color filter layer 23 is provided in interval regions within the black matrix 21.

In the present embodiment, the touch screen further comprises a backlight source (not shown in FIG. 1), the backlight source is provided at a side of the array substrate 1 away from the color filter substrate 2, the fixed electrode 4 is disposed at a side of the backlight source away from the array substrate 1, and the fixed electrode 4 is grounded. Certainly, the fixed electrode 4 may also be connected to a fixed voltage. In a case that the fixed electrode 4 is disposed at the side of the backlight source away from the array substrate 1, the fixed electrode 4 will not affect the normal display of the touch screen, and can shield and isolate the touch screen from other circuits (e.g., other circuits inside the touch apparatus), thus the touch screen will not discharge to other circuits, and other circuits will not affect or damage an inside of the touch screen.

Figure 2:
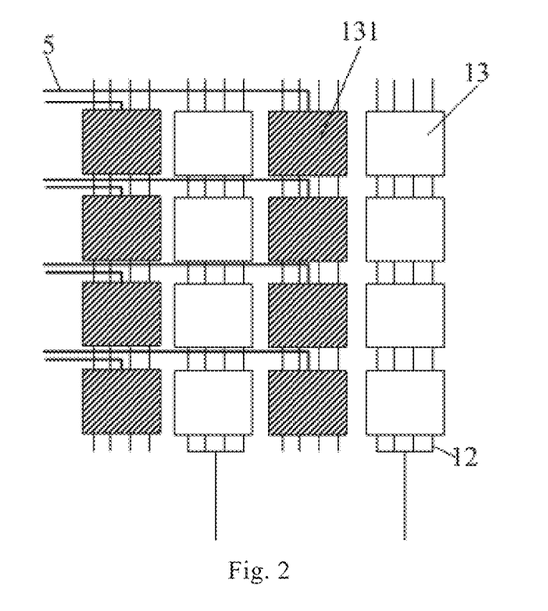
FIG. 2 is a structural top view diagram of first driving electrodes and sensing lines and their connection lines in FIG. 1.

In the present embodiment, as shown in FIG. 2, each of the first driving electrodes 131 in a same row is connected to one driving signal line 5. In this case, when the pressure sensing touch control is performed on the touch screen, the first driving electrodes 131 in the same row are simultaneously applied with a pressure sensing touch control driving signal, thus a driving of progress scan (scan row by row) is achieved during the pressure sensing touch control. For example, in the present embodiment, the sensing lines 12 corresponding to each even column of the common electrodes 13 are connected together, thus mutual capacitances are generated between the odd columns of the common electrodes 13 and the sensing lines 12 corresponding to the even columns of the common electrodes 13, with the assistance of the fixed electrode 4, a mutual-capacitance pressure sensing touch control is achieved.

Figure 3:
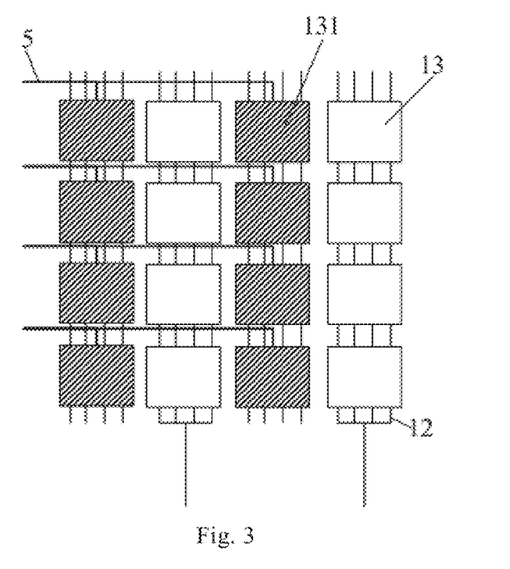
FIG. 3 is another structural top view diagram of the first driving electrodes and the sensing lines and their connection lines.

It should be noted that, as shown in FIG. 3, the first driving electrodes 131 in a same row may also be connected to a same driving signal line 5. In such a configuration, when the pressure sensing touch control is performed on the touch screen, the first driving electrodes 131 are driven in a progress scan (scan row by row) manner, thus a driving of a progress scan (scan row by row) is achieved during the pressure sensing touch control.

In addition, it should be noted that, in the present embodiment, the sensing lines 12 corresponding to the odd columns of the common electrodes 13 functioned as the first driving electrodes during the pressure sensing touch control do not play any role when the pressure sensing touch control is performed, thus the sensing lines 12 corresponding to the odd columns of the common electrodes 13 are not connected to any signal line, that is, are suspended.

In the present embodiment, the common electrodes 13 may also function as second driving electrodes during a self-capacitance sensing touch control. That is to say, when the self-capacitance sensing touch control is performed on the touch screen, all the common electrodes 13 function as the second driving electrodes. Each of the second driving electrodes is connected to one driving signal line, and in such a connection, the touch screen can achieve the self-capacitance sensing touch control.

It should be noted that, a function of the common electrodes 13 for displaying, or a function of the common electrodes 13 being used as the first driving electrodes or the second driving electrodes can be achieved, as long as a signal provided to the corresponding common electrodes 13 is changed. For example, a common voltage signal is provided to the common electrodes 13 during displaying, and a pressure sensing touch control driving signal is provided to the odd columns of the common electrodes 13 functioned as the first driving electrodes during a pressure sensing touch control, and a self-capacitance sensing touch control driving signal is provided to all the common electrodes 13 during the self-capacitance sensing touch control.

In addition, it should be noted that, when the first driving electrodes 131 in a same row are connected to a same driving signal line 5, the common electrodes 13 cannot function as the second driving electrodes during the self-capacitance sensing touch control, because when the common electrodes 13 function as the first driving electrodes during the self-capacitance sensing touch control, each of the common electrodes 13 must be connected to one driving signal line 5.

Figure 4:
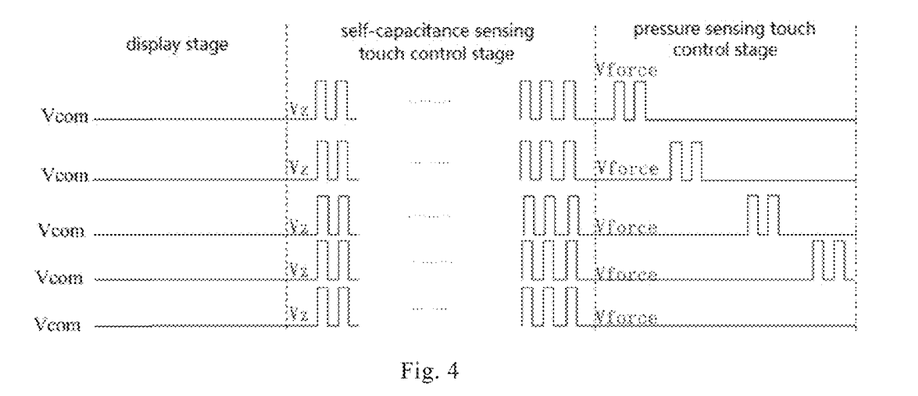
FIG. 4 is a drive timing diagram of common electrodes in the touch screen shown in FIG. 1.

Based on a structure of the touch screen described above, the present embodiment also provides a driving method for the touch screen, and the driving method comprises a display stage and a pressure sensing touch control stage, the display stage and the pressure sensing touch control stage are performed in a time division mode. As shown in FIG. 4, in the display stage, a common voltage signal Vcom is provided to the common electrodes. In the pressure sensing touch control stage, odd columns of the common electrodes function as the first driving electrodes and are provided with a pressure sensing touch control driving signal Vforce, the sensing lines corresponding to even columns of the common electrodes function as the sensing electrodes to sense a change of the pressure sensing touch control driving signal, the fixed electrode assists the first driving electrodes and the sensing electrodes to detect the touch pressure, meanwhile, a common voltage signal is provided to even columns of the common electrodes.

In the present embodiment, in the pressure sensing touch control stage, the first driving electrodes are driven row by row, which makes the mutual-capacitance pressure sensing touch control to be achieved better.

In the present embodiment, the pressure sensing touch control stage is inserted after displaying of any row of pixels in a frame of a picture and before displaying of the next row of pixels in the frame of the picture.

It should be noted that, the pressure sensing touch control stage may also be inserted after displaying of a frame of a picture and before displaying of the next frame of the picture.

In the present embodiment, the driving method further comprises a self-capacitance sensing touch control stage, the display stage, the pressure sensing touch control stage and the self-capacitance sensing touch control stage are performed in a time-division mode; and in the self-capacitance sensing touch control stage, the common electrodes function as second driving electrodes and are provided with a self-capacitance sensing touch control driving signal Vz.

In the present embodiment, in the self-capacitance sensing touch control stage, the second driving electrodes are driven simultaneously, the self-capacitance sensing touch control stage is inserted after displaying of any row of pixels in a frame of a picture and before displaying of the next row of pixels in the frame of the picture. Certainly, the self-capacitance sensing touch control stage may also be inserted after displaying of a frame of a picture and before displaying of the next frame of the picture.

Second Embodiment

Figure 5:
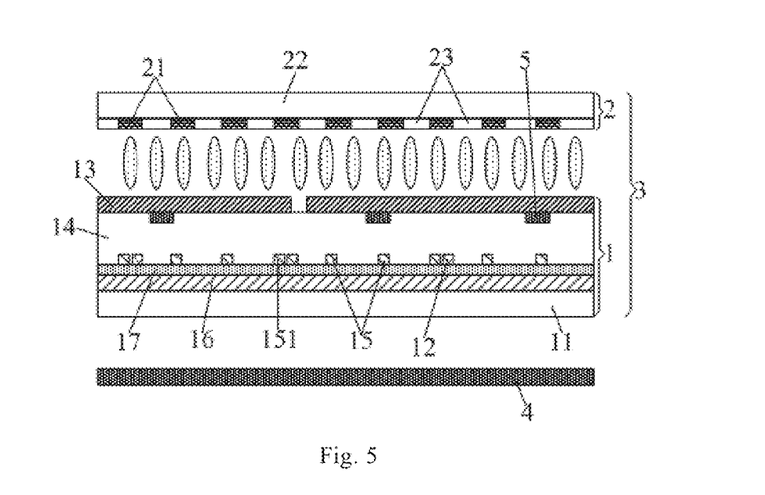
FIG. 5 is a structural cross-sectional view diagram of a touch screen in a second embodiment of the present invention.

The present embodiment provides a touch screen, which is different from that in the first embodiment in that, as shown in FIG. 5, in the present embodiment, the touch screen further comprises a plurality of first data lines 151, and in an arrangement direction of the data lines 15, two data lines 15 are provided in every interval between two of the first data lines 151, the sensing lines 12 and the first data lines 151 are arranged side by side in a one-to-one correspondence mode.

The sensing lines 12 in the present embodiment are less than those in the first embodiment, thus an aperture ratio of the touch screen while displaying is improved.

Other structures and the driving method for the touch screen in the present embodiment are the same as those in the first embodiment, and will not be described again here.

Third Embodiment

The present embodiment provides a touch screen, which is different from those in the first and second embodiments in that, the common electrodes in the present embodiment do not function as the second driving electrodes during the self-capacitance sensing touch control. That is to say, the touch screen in the present embodiment only has the pressure sensing touch control function and does not have the self-capacitance sensing touch control function.

Figure 6:
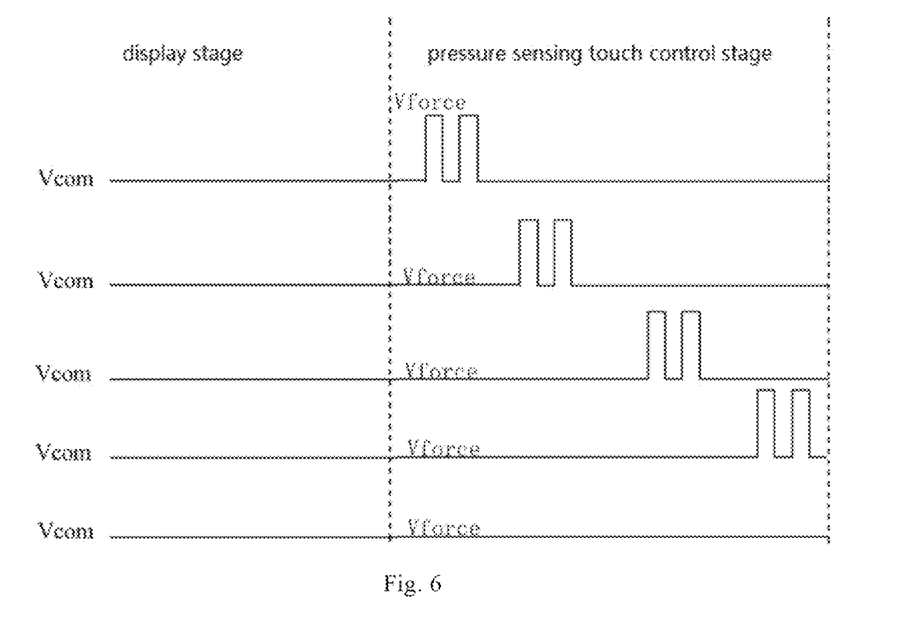
FIG. 6 is a drive timing diagram of common electrodes of a touch screen in a third embodiment of the present invention.

Correspondingly, as shown in FIG. 6, the driving method for the touch screen in the present embodiment only has the display stage and the pressure sensing touch control stage and does not have the self-capacitance sensing touch control stage.

Other structures and the driving method for the touch screen in the present embodiment are the same as those in the first or second embodiment, and will not be described again here.

The first through third embodiments have at least one of following beneficial effects.

The touch screens of the first through third embodiments achieve a completely embedded pressure sensing touch control by using the common electrodes as the first driving electrodes during the pressure sensing touch control, using the sensing lines corresponding to the common electrodes arranged alternatively with the first driving electrodes as the sensing electrodes during the pressure sensing touch control, and using the middle-frame for supporting the touch screen as the fixed electrode to assist detecting of a touch pressure, which reduces a manufacturing difficulty of a pressure sensing touch screen, improves a touch control accuracy of the pressure sensing touch screen, and reduces a cost of producing and assembling of the pressure sensing touch screen, and thus the pressure sensing touch screen can be more rapidly and widely spread.

Fourth Embodiment

The present embodiment provides a display apparatus comprising the touch screen in any of the first through third embodiments.

The display apparatus of the present embodiment achieves a mutual-capacitance pressure sensing touch control by using the touch screen in any of the first through third embodiments, and also reduces a cost of producing and assembling of the display apparatus.

The display apparatus may be any product or component with a display function, such as a mobile phone, a tablet computer, a television, a display, a notebook computer, a digital photo frame, a navigator.

It should be understood that the above embodiments are merely exemplary embodiments adopted for describing the principle of the present invention, but the present invention is not limited thereto. Various modifications and improvements may be made by those skilled in the art without departing from the spirit and essence of the present invention, and these modifications and improvements also fall into the protection scope of the present invention.

The invention claimed is:

1. A touch screen, comprising a liquid crystal cell formed by aligning and combining an array substrate with a color filter substrate and a fixed electrode disposed on a side of the array substrate away from the color filter substrate, wherein the array substrate comprises a base substrate, a plurality of sensing lines and a plurality of common electrodes arranged in a matrix, which are disposed on the base substrate, orthographic projections of the sensing lines and the fixed electrode on the base substrate overlap with orthographic projections of the common electrodes on the base substrate, an extending direction of each of the sensing lines is parallel to a column direction of arrangement of the common electrodes; a portion of the common electrodes are configured to function as first driving electrodes during a pressure sensing touch control, the sensing lines corresponding to the rest of the common electrodes are configured to function as sensing electrodes during the pressure sensing touch control; the fixed electrode is configured to assist the first driving electrodes and the sensing electrodes to detect a touch pressure during the pressure sensing touch control.

2. The touch screen of claim 1, wherein odd columns of the common electrodes are configured to function as the first driving electrodes, and the sensing lines corresponding to even columns of the common electrodes are configured to function as the sensing electrodes.

3. The touch screen of claim 1, wherein even columns of the common electrodes are configured to function as the first driving electrodes, and the sensing lines corresponding to odd columns of the common electrodes are configured to function as the sensing electrodes.

4. The touch screen of claim 1, wherein the common electrodes are provided at a side of the sensing lines proximal to the color filter substrate, and an insulating layer is provided between the common electrodes and the sensing lines; and the array substrate further comprises a plurality of data lines, the sensing lines and the data lines are made of a same material and provided in a same layer, the sensing lines are parallel to the data lines.

5. The touch screen of claim 4, wherein the sensing lines and the data lines are arranged side by side in a one-to-one correspondence mode.

6. The touch screen of claim 4, wherein the array substrate further comprises a plurality of first data lines, the sensing lines, the data lines and the first data lines are made of a same material and provided in a same layer, and in an arrangement direction of the data lines, two data lines are provided in an interval between every two of the first data lines, the sensing lines and the first data lines are arranged side by side in a one-to-one correspondence mode.

7. The touch screen of claim 4, wherein the color filter substrate comprises a black matrix, and an orthographic projection of the black matrix on the array substrate completely covers the sensing lines and the data lines.

8. The touch screen of claim 1, further comprises a backlight source, the backlight source is provided at a side of the array substrate away from the color filter substrate, the fixed electrode is disposed at a side of the backlight source away from the array substrate, and the fixed electrode is grounded or connected to a fixed voltage.

9. The touch screen of claim 1, wherein the first driving electrodes in a same row are connected to a same driving signal line; and the sensing lines functioning as the sensing electrodes and corresponding to each column of the common electrodes are connected together.

10. The touch screen of claim 1, wherein each of the first driving electrodes in a same row is connected to one driving signal line; and the sensing lines functioning as the sensing electrodes and corresponding to each column of the common electrodes are connected together.

11. The touch screen of claim 1, wherein the common electrodes are further configured to function as second driving electrodes during a self-capacitance sensing touch control, and each of the second driving electrodes is connected to one driving signal line.

12. A display apparatus, comprising the touch screen of claim 1.

13. A driving method for the touch screen of claim 1, the driving method comprises a display stage and a pressure sensing touch control stage, the display stage and the pressure sensing touch control stage are performed in a time division mode;

in the display stage, a common voltage signal is provided to the common electrodes;

in the pressure sensing touch control stage, a portion of the common electrodes function as the first driving electrodes and are provided with a pressure sensing touch control driving signal, the sensing lines corresponding to the rest common electrodes function as the sensing electrodes to sense a change of the pressure sensing touch control driving signal, the fixed electrode assists the first driving electrodes and the sensing electrodes to detect the touch pressure, meanwhile, a common voltage signal is provided to the common electrodes corresponding to the sensing electrodes.

14. The driving method of claim 13, wherein odd columns of the common electrodes function as the first driving electrodes, and the sensing lines corresponding to even columns of the common electrodes function as the sensing electrodes.

15. The driving method of claim 13, wherein even columns of the common electrodes function as the first driving electrodes, and the sensing lines corresponding to odd columns of the common electrodes function as the sensing electrodes.

16. The driving method of claim 13, wherein in the pressure sensing touch control stage, the first driving electrodes are driven row by row.

17. The driving method of claim 13, wherein the pressure sensing touch control stage is inserted after displaying of any row of pixels in a frame of a picture and before displaying of the next row of pixels in the frame of the picture; or, the pressure sensing touch control stage is inserted after displaying of a frame of a picture and before displaying of the next frame of the picture.

18. The driving method of claim 13, further comprises a self-capacitance sensing touch control stage, the display stage, the pressure sensing touch control stage and the self-capacitance sensing touch control stage are performed in a time-division mode; and in the self-capacitance sensing touch control stage, all of the common electrodes function as second driving electrodes and are provided with a self-capacitance sensing touch control driving signal.

19. The driving method of claim 18, wherein in the self-capacitance sensing touch control stage, the second driving electrodes are driven simultaneously.

20. The driving method of claim 18, wherein the self-capacitance sensing touch control stage is inserted after displaying of any row of pixels in a frame of a picture and before displaying of the next row of pixels in the frame of the picture; or, the self-capacitance sensing touch control stage is inserted after displaying of a frame of a picture and before displaying of the next frame of the picture.

\* \* \* \* \*